June 26, 1962  J. L. RODGERS, JR., ETAL  3,040,378
AUTOMATIC TRANSFER AND COMPRESSION PLASTIC MOLDING PRESS
Filed Sept. 22, 1959  10 Sheets-Sheet 3

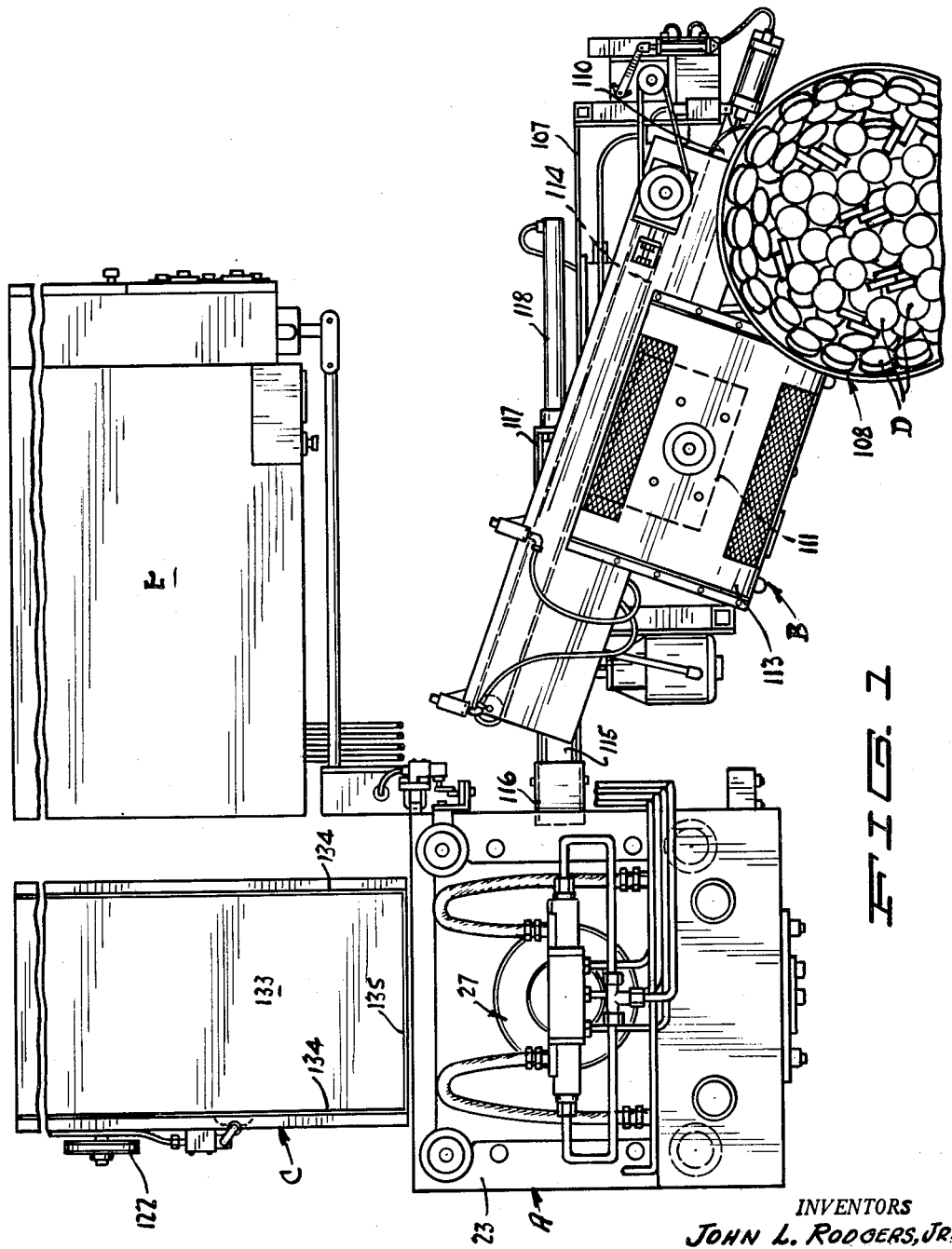

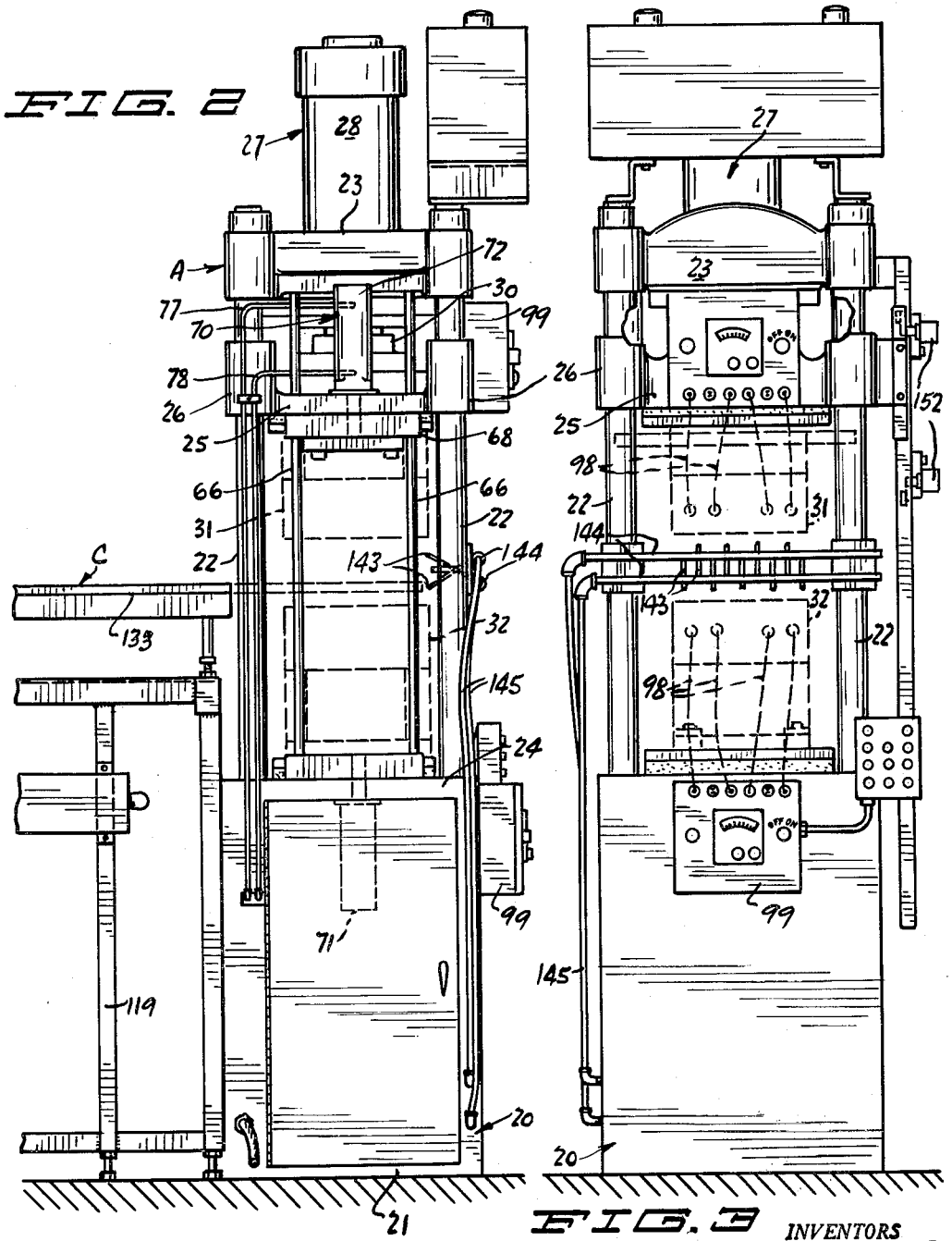

INVENTORS
JOHN L. RODGERS, JR.
BY VERNON K. QUARVE

Carlson & Hoyle
ATTORNEYS

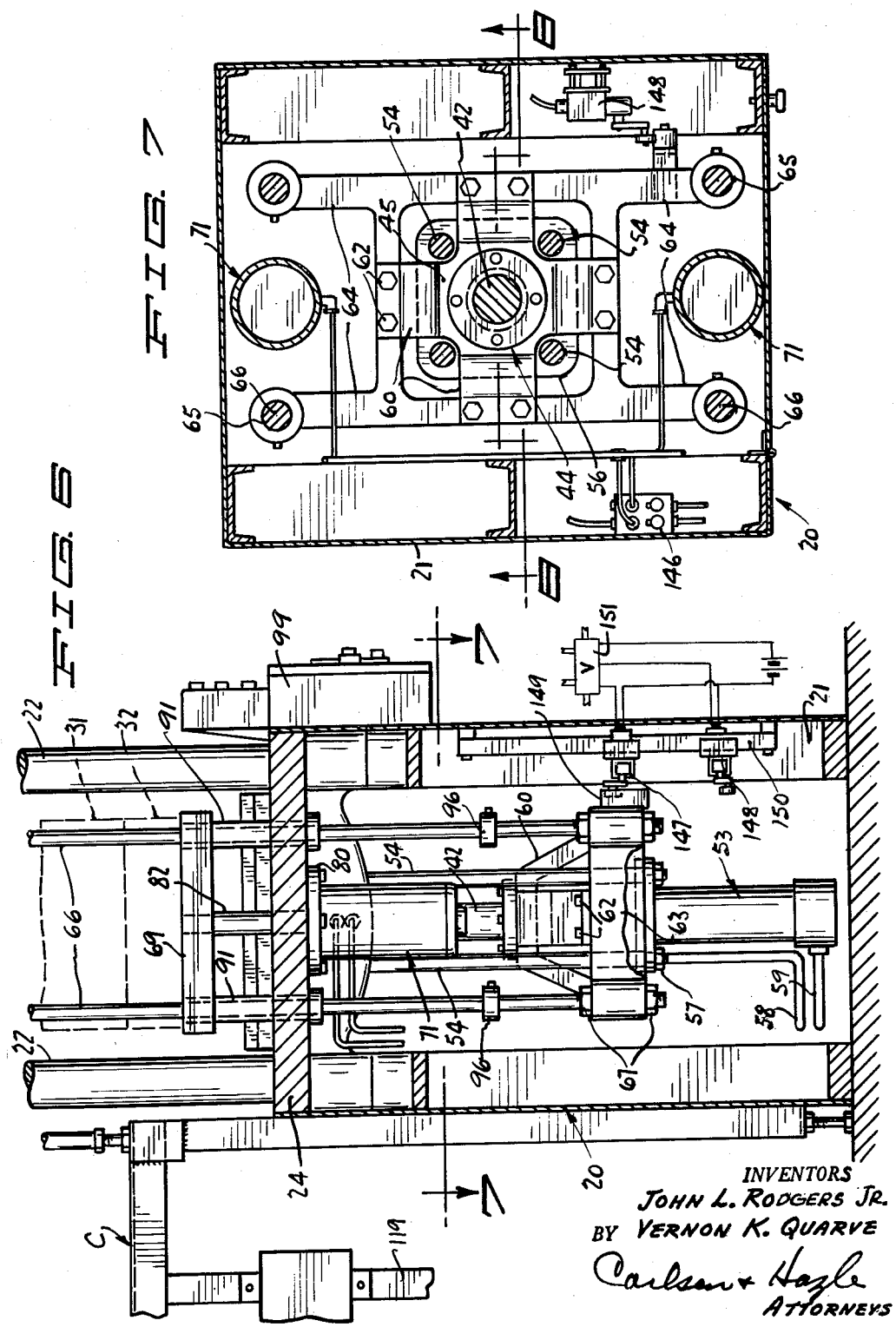

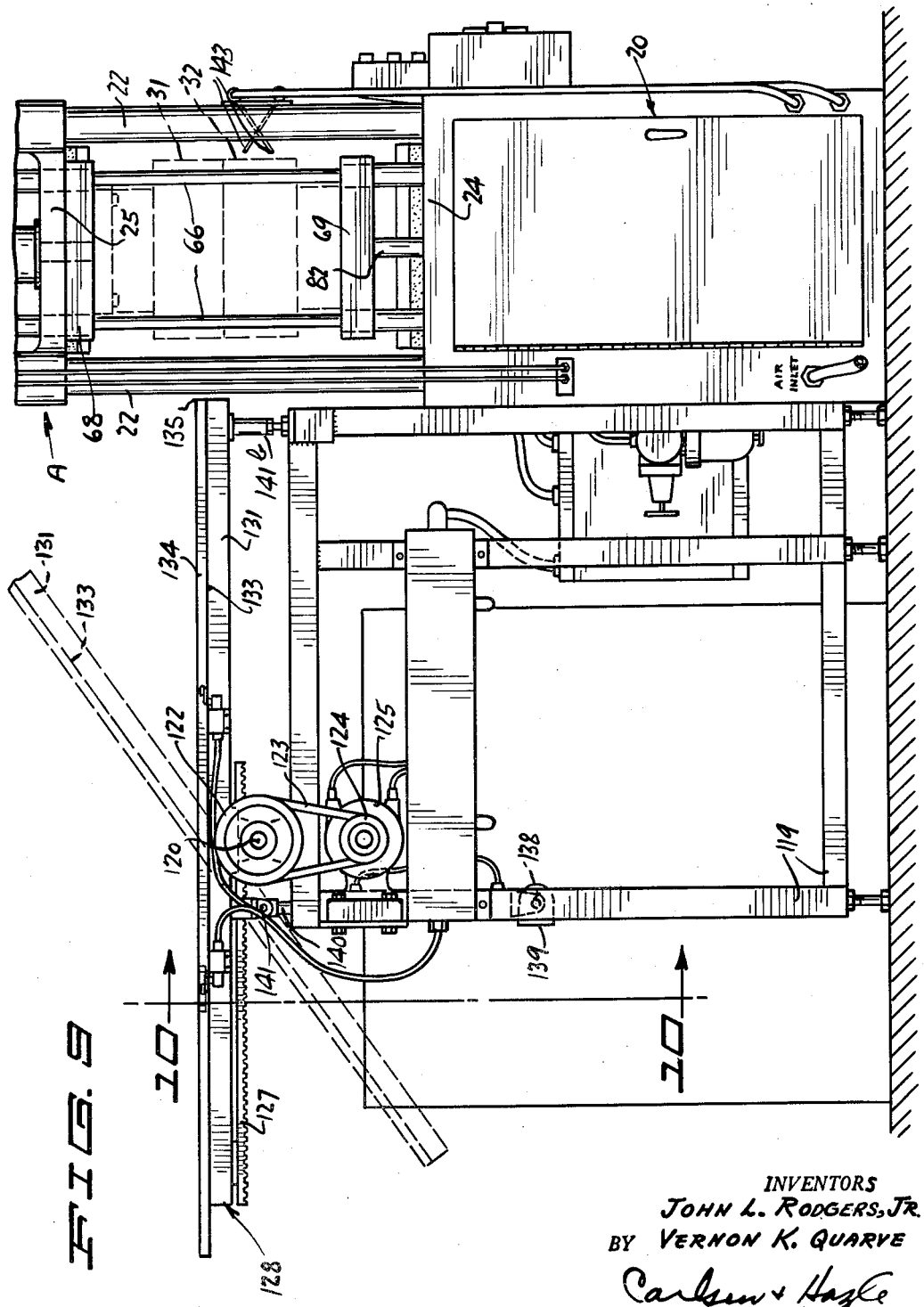

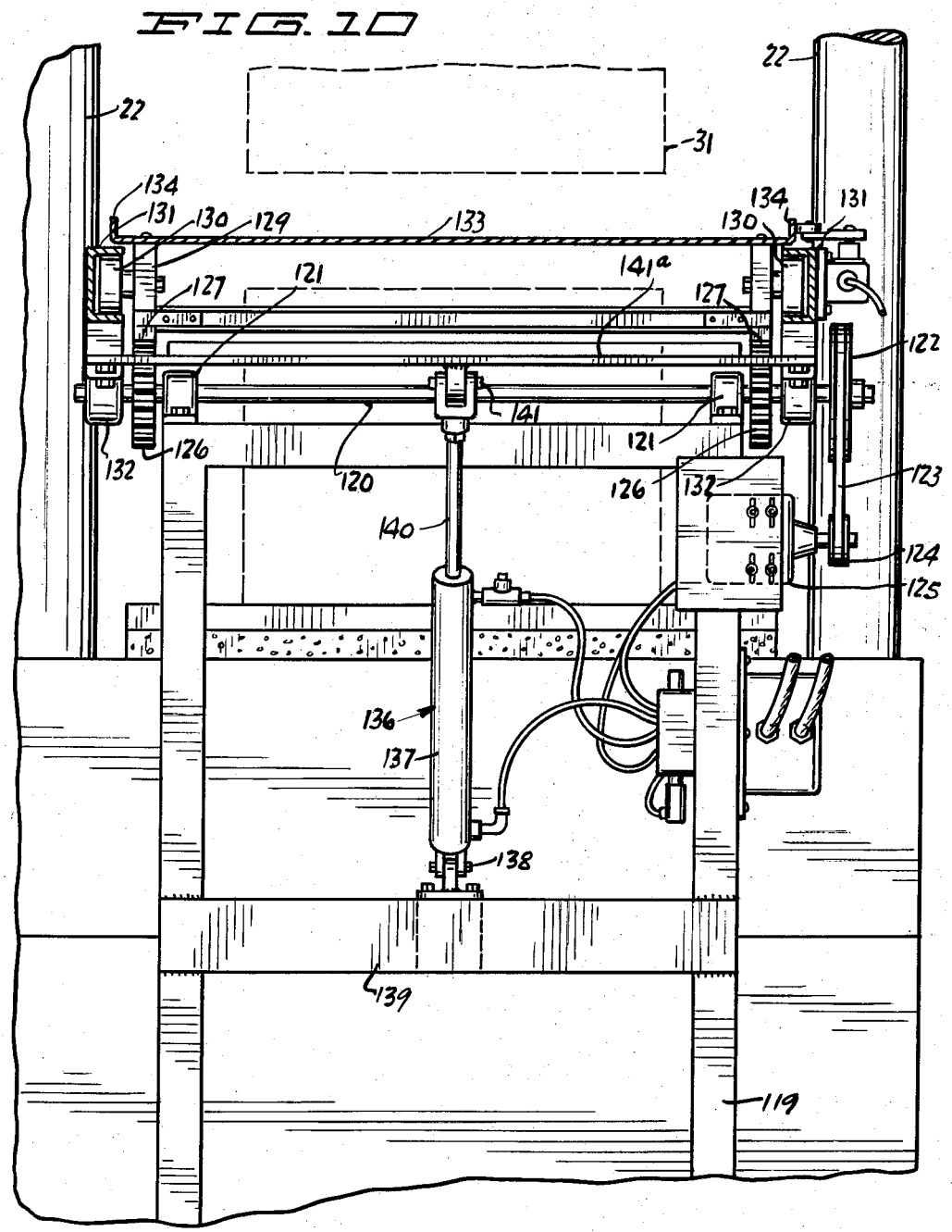

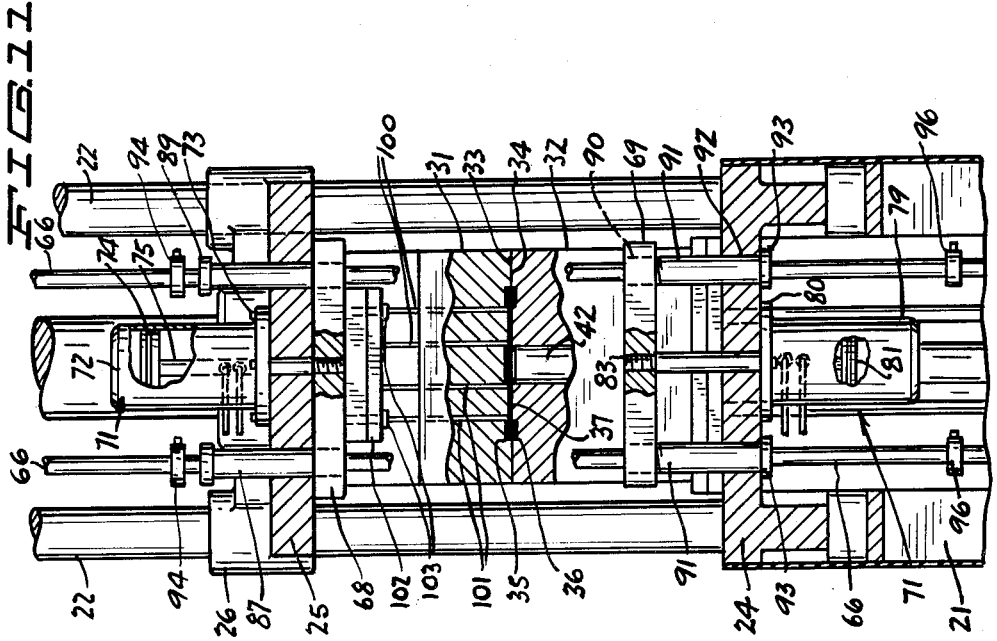

June 26, 1962 J. L. RODGERS, JR., ETAL 3,040,378
AUTOMATIC TRANSFER AND COMPRESSION PLASTIC MOLDING PRESS
Filed Sept. 22, 1959 10 Sheets-Sheet 9
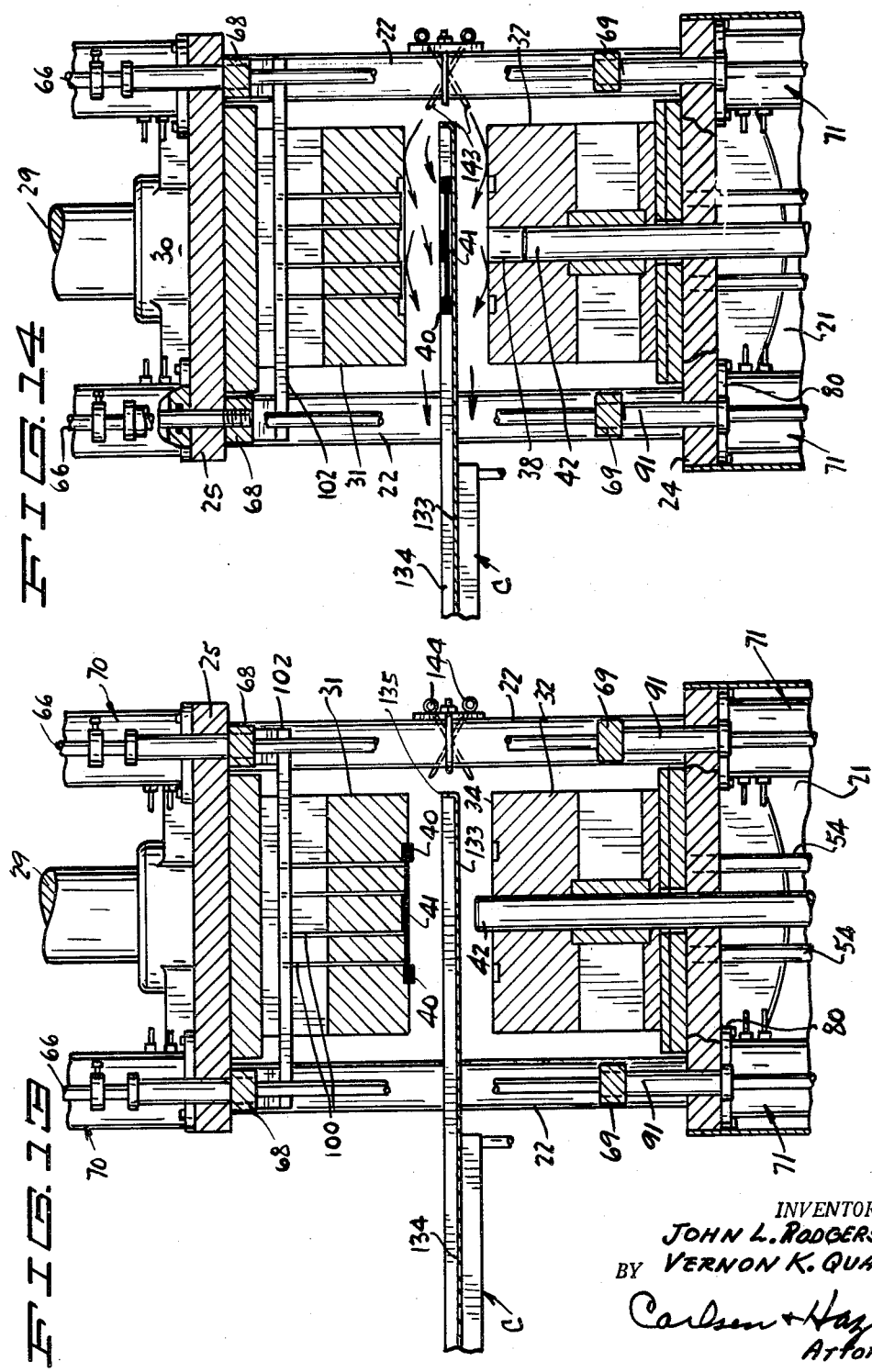
INVENTORS
JOHN L. RODGERS, JR.
BY VERNON K. QUARVE
Carlsen + Hayle
ATTORNEYS June 26, 1962  J. L. RODGERS, JR., ETAL  3,040,378
AUTOMATIC TRANSFER AND COMPRESSION PLASTIC MOLDING PRESS
Filed Sept. 22, 1959  10 Sheets-Sheet 10

INVENTORS
JOHN L. RODGERS, JR
BY VERNON K. QUARVE

Carlsen + Hafle
ATTORNEYS 3,040,378
AUTOMATIC TRANSFER AND COMPRESSION
PLASTIC MOLDING PRESS
John L. Rodgers, Jr., and Vernon K. Quarve, Minneapolis,
Minn., assignors to Rodgers Hydraulic, Incorporated,
Minneapolis, Minn., a corporation of Minnesota
Filed Sept. 22, 1959, Ser. No. 841,533
7 Claims. (Cl. 18—17)

Our invention relates in general to automatic presses used for the production of articles of various kinds from materials of the type so commonly known as "plastics" but which of the kind here used are more accurately defined as thermosetting resins or analogous thermosetting materials, the composition of which is such that they may be heated, subjected to pressure and formed into desired shapes after which they are permitted to cure or set, providing articles of smooth textured, attractive appearance, of relatively infrangible nature and having desirable characteristics of relatively low cost, light weight and good dielectric or insulating value, all characteristics lending the articles to a wide variety of uses. More specifically our improved press is adapted for automatic, low cost production of molded parts from thermosetting material deposited in mold cavities in a continuous sequence of operations and which includes, for one cycle of operation, the supply of a predetermined amount of the material in a pre-heated condition to the press while the molds are spread apart, with the material then subjected to additional plasticizing heat by heating means associated with the molds as well as by heat developed by the great pressure of the molds as they close and force the material at high velocity through the mold sprues and gates into the molding or forming cavities; following which the molds remain for a time in the closed condition until the material cures and the cycle of operation is completed by the re-opening of the press and ejection of the cured articles along with the associated flash or cull. The parts and this cull are taken out of the machine by properly timed operation of suitable unloading or delivery means and a properly directed air blast not only clears the material from between the molds but also blows out any particles of the hardened or cured material which might tend to adhere and otherwise interfere with subsequent cycles of operation.

It is a primary object of our invention to provide a machine of this general character which, once it is properly set up, may be either manually or automatically controlled for the production of articles at a sufficiently high speed to reduce the per unit cost as far as is possible consistent with good and consistent work, and in which the various operations going to make up each complete cycle, not only of opening and closing the press itself along with the pre-measurement and pre-heating as well as the feed of the "raw" material by the press loading mechanism, but also the ejection of the cast and cured parts and associated culls from the mold cavities by what we designate as the parts unloader (and all related functioning of other parts of the press) as will be made clear hereinafter, are all properly related and timed to produce the articles with a minimum of elapsed time for each such cycle. In addition and as an advantageous feature in the setting up of the machine for automatic production, as well as for the occasional checking of the proper operation thereof, we also provide for manual or semi-automatic operation in which any of the component cyclic automatic functions may be interrupted by overriding the automatic sequencing system as may be required.

While not restricted to transfer molding operations our improved press is particularly suitable therefor in that provision is made for the proper cleaning of the pot and associated transfer ram which components are associated with one of the molds in order to receive a measured charge of pre-heated material, the heating of which is continued once the press is closed, following which the ram ejects or transfers the material and forces it in a plasticized condition and at high velocity into the mold cavities. Because of the nature of the material itself as it is heated, and the relatively tremendous pressures to which the material is subjected in the press, the transfer ram tends to wear about the peripheral edge of its end portion in particular and it is necessary that the ram be cleared completely of all flash or small portions of material which may tend to harden and adhere thereon following each such transfer operation. In accordance with our invention we provide what may be referred to and most accurately described as a double-wipe operation by virtue of which during each operating cycle of the press the ram is moved by a transfer cylinder not once but twice beyond the face of the mold wherein the pot is formed, thus to expose the end portion of the ram to suitably directed blasts of compressed air which will forcibly blow off hardened, loosened flash from the ram (as well as from the mold faces) leaving all parts completely clean for the next operation. It will, of course, be understood that this reciprocatory motion of the ram takes place while the molds are open and that prior to the closing of the molds by the press the ram will return to its starting position within the pot in the associated mold in order to receive the next charge of the pre-heated molding material.

Another object of this invention is to provide a plastic molding press including means for mounting the molds and compressed air mechanism for positioning the ejector mechanisms, whether used for top or bottom ejection, in cooperation with means actuated in conjunction with the transfer ram for moving the ejector mechanisms against the pressure of the operating air to appropriately project the pins from the mold faces as necessary to clear the molded and cured articles for delivery from the press. The use of compressed air actuated ram plungers for operating the ejector mechanisms is desirable both in that precise, timed control over operations is possible and changeover from top to bottom ejection is readily made, as compared to the biasing springs and other devices heretofore utilized for the purpose.

Still another object of our invention is to provide, in conjunction with the aforesaid general type of press, cooperating means associated therewith for accurately selecting the required number of preforms of the kind in which thermosetting resin molding materials are customarily supplied for such precision casting operations, and the use of so-called dielectric or electronic pre-heating of these preforms so that they assume what may be best described as a "doughy" condition, just short of a flowing consistency, at which point they may be introduced without difficulty by the loading mechanism into the press but in a condition such that they are readily plasticized as the molds close and the full cycle time is materially reduced, with a corresponding reduction in the production cost per item. It will be understood, of course, that while the press remains in its closed condition and the cast parts are curing the next charge of material is undergoing its preheat and being readied for introduction into the machine, as soon as the previous batch of parts are ejected from the molds and removed from the machine, and all flash and cull material are blown clear leaving the molds in condition for the next operation.

These and other more detailed and specific objects will be disclosed in the course of the following specification, reference being had to the accompanying drawings, in which—

FIG. 1 is a top plan view of a press according to our invention, showing the same in association with the means for pre-heating and feeding the molding material into the press, as well as the mechanism for carrying away the completed molded articles.

FIG. 2 is a side elevation of the press on a somewhat reduced scale and showing a portion only of the said mechanism by which the molded parts are carried away.

FIG. 3 is a frontal elevation of the press to the same scale as FIG. 2, and in both FIGS. 2 and 3 the press is shown in the open position, with the molds and certain associated components illustrated only in dotted lines, and certain parts omitted for the sake of clarity.

FIG. 6 is a fragmentary vertical sectional and elevational view through the lower part of the press, viewing the same from the same direction as FIG. 2 and showing certain of the parts in the positions they assume as the press is closed.

FIG. 7 is a horizontal sectional view along the line 7—7 in FIG. 6.

FIG. 9 is a side elevation viewing the press from the same side as FIG. 2, but at a larger scale, with a portion of the press broken away and the molds shown closed and in dotted lines, and in particular illustrating the construction of the mechanism by which the cast parts are carried away from the press.

FIG. 10 is an enlarged fragmentary vertical sectional view and elevation taken substantially along the line 10—10 in FIG. 9, parts of the opened molds appearing in dotted lines.

FIG. 11 is a fragmentary vertical sectional and detail view through a central portion of the press showing the molds in full lines, in section and in their closed positions, with the mold cavities filled with the plasticized molding material by the action of the transfer ram. In this and succeeding views, unless otherwise noted, the press is arranged for top ejection and transfer molding.

FIG. 12 is a similar sectional and vertical elevational view, taken at an angle of ninety degrees with reference to FIG. 11, showing the molds in their opened position, with the previously cast parts ejected by downward movement of the upper ejector pins and the parts unloader in position to receive the parts.

FIG. 13 is a view similar to FIG. 12, but showing the press with the molds spread apart, with the unloader mechanism for receiving the cast parts moved inward, and ejector pins in upper positions.

FIG. 14 is a view similar to FIG. 12 showing the cast parts as dropped upon the mechanism by which they are moved out of the press and also illustrating the action of the compressed air jets for cleaning the mold faces as will be presently set forth.

FIG. 15 is a view similar to FIG. 11 but with the molds in their open position and showing the pot in the lower mold as it is being charged with the casting material.

FIG. 16 is a similar view but showing the press set up for, and in the process of, bottom ejection of the molded parts or articles from the lower mold.

Figure 8:
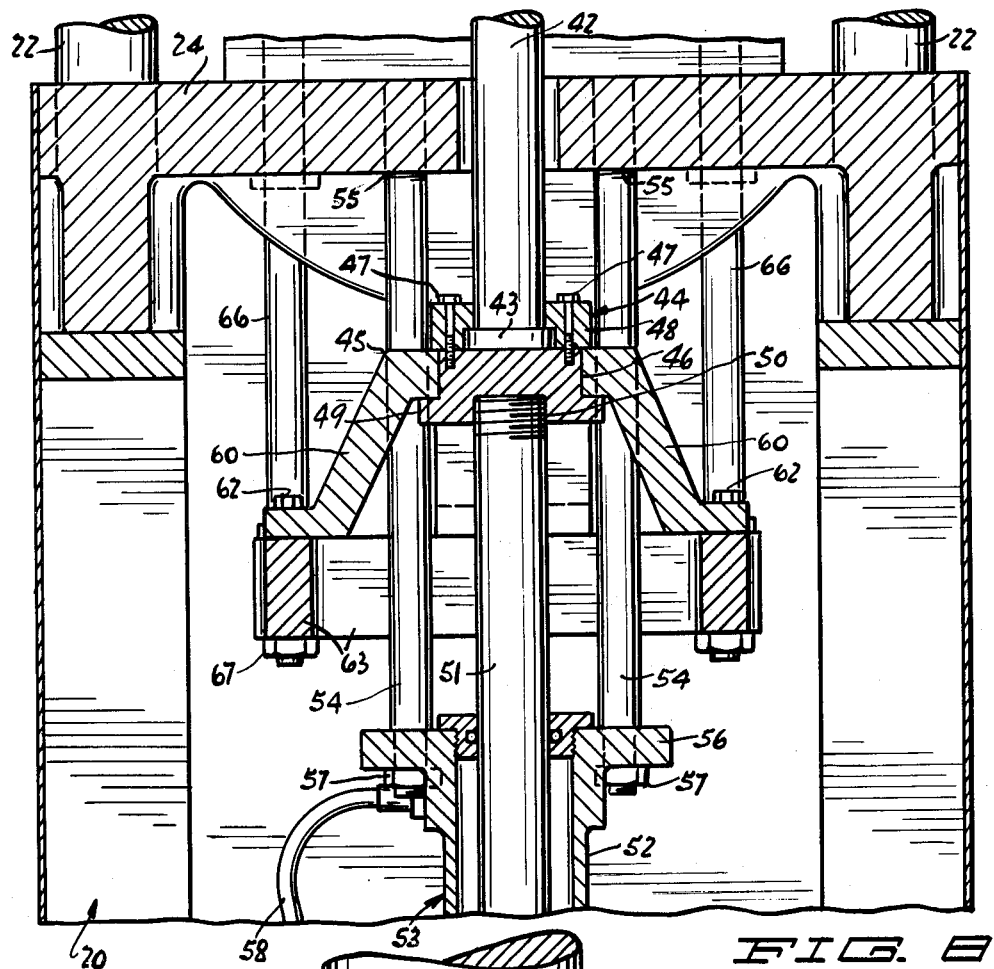
FIG. 8 is a further enlarged fragmentary vertical sectional view taken substantially along the line 8—8 in FIG. 7.
Figure 4:
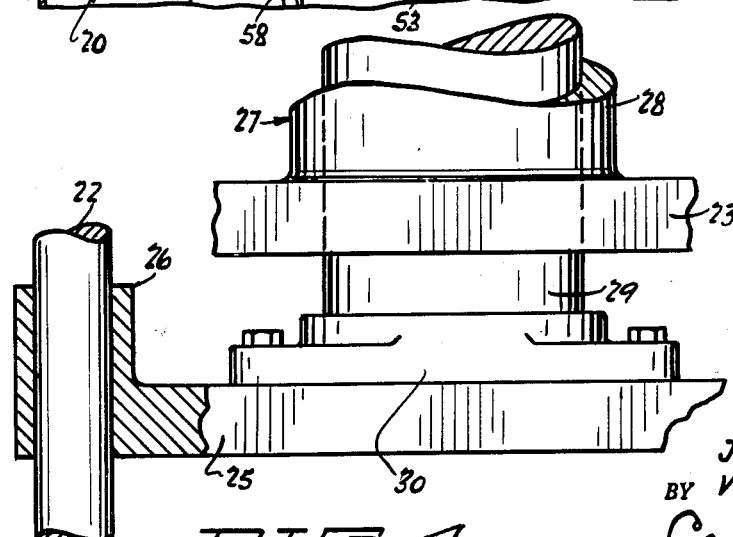
FIG. 4 is a fragmentary detail elevational and partially vertically sectional view showing the association between the upper or clamp ram and the upper mold-carrying platen.

Referring now more particularly and by reference characters to the drawing our improved press is designated generally at A and is herein shown as operatively associated with a mechanism B by which the plastic or molding material is pre-heated and fed or loaded in carefully predetermined quantities into the press each cycle thereof, and also a mechanism C by which the molded and cured parts formed in the press are unloaded or delivered therefrom. In accordance with modern methods of high speed production of parts molded from thermosetting resins and analogous materials the "raw" material sufficient to charge the press for each cyclic operation thereof is supplied to the press A by mechanism B in tablet-like preforms D so that each charge will be exactly in the amount required for proper filling of the mold cavities. In addition to the units A, B and C the complete press set up includes a supply and control unit E (FIG. 1) by which properly controlled fluid and air pressure supplies, and electrical energy are distributed to the various operating parts.

The press A comprises a frame structure 20 including a heavy base frame and housing 21 from which there arise four equally spaced upright heavy standards or tie rods 22 forming the corners of a rectangle or square as viewed from above. Secured firmly atop these standards 22 is a head frame 23 suitably held against upward displacement by the heavy thrust forces as the molds are closed. The lower base and housing structure 21 is topped by a lower platen 24 arranged in a horizontal plane and from the corners of which arise the aforesaid standards 22. An upper, horizontally arranged platen 25 is located below the head frame 23 and at its corners has vertically enlarged bearing lugs 26 slidable along the standards so that this platen may move upwardly and downwardly with respect to the lower platen 24, being guided in such travel by the standards 22, as will be readily apparent. Atop the press there is positioned a heavy duty clamp ram 27 (FIGS. 1 and 2) the cylinder 28 of which is rigid with respect to the head frame 23 while the downwardly projecting fluid or hydraulically actuated heavy plunger 29 is secured at 30 to the upper platen 25 to raise and lower the same as fluid under pressure is selectively conducted to and evacuated from the opposite ends of said cylinder. While not material to an understanding of our present invention it may be noted that the frame 20, aside from the housing structure per se at the base and the standards 22 is made up from heavy suitably ribbed and stiffened castings, as are also the platens 24 and 25, in order that a structure of reasonable cost is provided but one capable of standing up to the very heavy stresses and strains to which it is subjected in use. It is necessary also, in high speed production equipment of this nature, that the parts stand up to these strains over long periods of time, without becoming distorted or misaligned as will also be understood to those skilled in the art.

The purpose of our invention is, as stated, to provide a machine producing molded article of thermosetting resinous material and the like, at a high rate of production and with little or no attention from an operator once the machine has been set up. The articles whatever they may be are formed usually in groups in suitable cavities in upper and lower molds herein indicated at 31 and 32 which are, respectively, secured to the upper, moving platen 25 and to the lower, stationary platen 24. These molds 31—32 have accurately meeting faces 33—34 wherein are formed cavities 35—36 properly shaped to mold the parts or articles desired, and as usual such mold faces are also formed (either or both) with suitable sprues and gates denoted collectively at 37 outward through which the plasticized molding material is forced into the cavities as the molds close. Such sprues emanate from and communicate with a pot 38 formed in the upper surface of the lower mold 32 and registering with a central recess 39 in the upper mold face (FIGS. 11–16). In the drawings the molded articles or parts are indicated at 40 and it will be understood, of course, that as they initially come from the molds they will be joined by the gates to the ends of the sprues in what amounts to a spider-like cull 41 but that the articles themselves will break cleanly from the cull and any flash which may be formed during the molding operation.

Vertically slidable in the pot 38 is a transfer ram plunger 42 which very closely fits the walls of the pot and said plunger extends downwardly through the lower mold 34, through the lower platen 24 into the base 21 wherein (FIGS. 6, 7 and 8) said plunger is secured at its lower diametrically enlarged end 43 by means of a two-part clamping ring assembly 44 to the center of a spider 45. Said spider 45 has a center opening 46 (FIG. 8) in which said assembly 44 is held by screws 47 which clamp its upper and lower parts or sections 48—49 together in marginally overlapping engagement with the opening 46, while also holding the spider and plunger 42 in assembly. The lower clamp section 49 has a downwardly opening, tapped socket 50 into which is threaded the upper end of a piston rod 51 slidable verticaly within the cylinder 52 of a transfer ram 53 and the said cylinder is suspended from the lower platen 24 by a series of hanger bolts 54 (FIGS. 6–8) tapped at upper ends 55 into the lower platen 24 at evenly spaced locations around the center axis of the transfer ram and its associated components. At lower ends these hanger bolts 54 extend through the flanged upper end 56 of the cylinder 52 and nuts 57 (FIG. 8) hold the cylinder against downward displacement as fluid under pressure is selectively admitted to and evacuated from opposite ends of the cylinder 52, as by suitable conduits 58—59, to raise and lower the piston rod 51, the spider 45 and transfer ram plunger 42, all as will be readily evident.

The spider 45 has a series of arms 60 which radiate, as viewed from above, from the axis of the plunger 42 and also angle outwardly-downwardly as seen in FIG. 1 terminating in apertured lugs 61 which are secured by suitable means such as the cap screws 62 to a generally rectangularly shaped yoke 63. Thus said yoke will be raised and lowered in consonance with the transfer ram plunger 42 and the yoke has four corner extensions 64 (FIG. 7) formed at their extremities with vertically elongated bores 65 in which are fitted the lower ends of upwardly extending, parallel and elongated actuator rods 66. Said rods 66 are secured to the yoke by any suitable means, such as upper and lower anchor nuts 67, and there are two of such rods at each side of the machine extending upwardly through the platens 24 and 25 in the same vertical fore and aft planes as the aforesaid standards 22 at the corresponding sides of the machine. Both standards and actuating rods clear the sides of the molds 31—32 but the latter are operatively associated with vertically movable ejector pin actuating side bars 68—69, the manner in which the rods 66 operate these bars 68—69 being presently made clear.

Primarily said side bars 68—69, which are located respectively at and clear of the opposite sides of the molds 31—32, are actuated by air rams 70—71 or reciprocating fluid motors which operate by compressed air, as contrasted with the fluid pressure, hydraulic system operating the aforesaid rams 27 and 53 as well as other parts of the machine still to be described. Said rams 70—71 are for convenience hereafter referred to as the ejector rams and comprise an upper pair located one adjacent each side of and above the upper platen 25 and a lower pair located one at each side of and beneath the lower platen 24, within the base 21 of the machine. The upper ejector rams 70 include air cylinders 72 flanged at lower ends 73 and secured thereby to the upper surface of the platen 25, and each such ram further has (as seen for the one in FIG. 11) a piston 74 from which a piston rod 75 depends slidably down through the platen to a threaded connection 76 with the center of the corresponding upper side bar 68. Suitable packing (not shown) seals around the piston rod 75 where it slides through the lower end of the ram cylinder and compressed air is supplied selectively to either upper or lower ends of the cylinders (while being vented from the other ends) as by conduits parts of which appear at 77—78. In a similar manner the lower ejector rams 71 each comprises a cylinder 79 flanged at its upper end 80 and secured thereby in suspended position from the lower platen 24, there being a piston 81 (shown only in part in FIG. 11) slidable in said cylinder, with an upwardly extending suitably sealed piston rod 82 projecting through the said platen and threaded at 83 into the center of the adjacent cross bar 69. Again conduit connections are made for selectively conducting compressed air to the opposite ends of these lower cylinders, said connections being only in part shown and designated at 84—85.

The aforesaid actuator rods 66 pass loosely through suitable openings indicated throughout at 86 in the opposite ends of the side bars 68—69, said openings being substantially larger in diameter than the rods. Sleeves 87 are pressed at lower ends into the openings 86 in the upper side bars 68, or otherwise anchored to the bars, and said sleeves slidably embrace the actuator rods, extending in an upward direction slidably through openings 88 provided for their accommodation in the upper platen 25 and the sleeves having diametrically enlarged flanged upper ends as seen at 89. The latter by contacting the upper surface of platen 25 limits downward movement of the upper side bar-ejector assembly of its own weight, as well as by the downward force exerted by the ejector rams 70 in set ups where upper ejection is not used (FIG. 16) as will be presently described. The lower side bars 69 likewise have openings 90 adjacent their ends, loosely passing lower portions of the actuator rods 66, and sleeves 91 are pressed at upper ends into said openings, depending therefrom in slidable engagement over the rods and down through openings 92 (FIGS. 11–12) in the platen 24, the lower extremities of the sleeves having enlarged flanges 93 to limit upward movement of the lower side bars 69 and associated stripper components of the lower mold.

In addition to movement of the side bars 68—69 by the aforesaid ejector rams 70—71 the said bars are also movable in response to upward-downward movements of the actuator rods 66 by the transfer ram 53. For this purpose the rods 66, above the upper platen 25, are provided with adjustable stop collars 94 having set screws 95 by which they may be secured at any elevation upon the upper portions of the rods. Likewise the lower end portions of the rods 66 below the lower platen 24 have similar stop collars 96 with set screws 97 for securing them where desired to the rods. Thus by proper adjustments of the upper and lower stops on stop collars 94—96 the upward-downward travel of the rods 66 (induced by the ejector ram 53 as aforesaid) may be caused to move the end bars 68 downward or the side bars 69 upward, as the case may be, the stops 94—96 engaging the flanged ends of the sleeves 87—91 to bring this about as is seen in FIGS. 12 and 16 respectively. Unless the stops 94—96 are so adjusted the rods 66 will simply slide freely through the sleeves without effect upon the side bars 68—69 and, of course, the adjustment of the collars 94—96 will permit any amount of travel to be imparted to the side bars within the full amplitude of movement of the rods themselves.

As is customary in other molds of presses of this kind they are provided with suitable heating means, which being wholly conventional are herein not shown and only in the frontal elevation of FIG. 3 do the control leads 98 from the usual control boxes 99 appear. As is also quite conventional in molds of this kind each is provided with ejector or shedder mechanism, the upper mold 31 carrying this mechanism where top ejection of the molded parts is required, and the lower mold 32 being so equipped where bottom ejection is expedient. Thus as best seen in FIGS. 11–15 said upper mold 31 carries a plurality of ejector pins 100, usually equal in number to the parts to be molded each operation and located in positions to eject or push the parts 40 and associated cull 41 downwardly as the press opens. The pins 100 are thus slidably associated with the mold 31 in suitable bores 101 therein and are carried by ejector plates 102 arranged in the upper part of the mold for upward-downward movements with respect thereto. The pins are customarily threaded into the ejector plate 102 and the latter projects at its ends outwardly (FIG. 12) beyond the mold sides, these projecting ends of the plate being suitably secured, as by the cap screws 103, to the adjacent upper side bars 68 to move therewith. When the press is set up for bottom ejection, i.e., for ejecting the molded parts in an upward direction from the lower mold 32, as per FIG. 16, that mold is similarly equipped with upward-downwardly slidable ejector pins 104 screwed into an ejector plate 105 slidable in the lower part of the mold and projecting from the sides thereof for fastening at 106 to the lower side bars 69.

Figure 5:
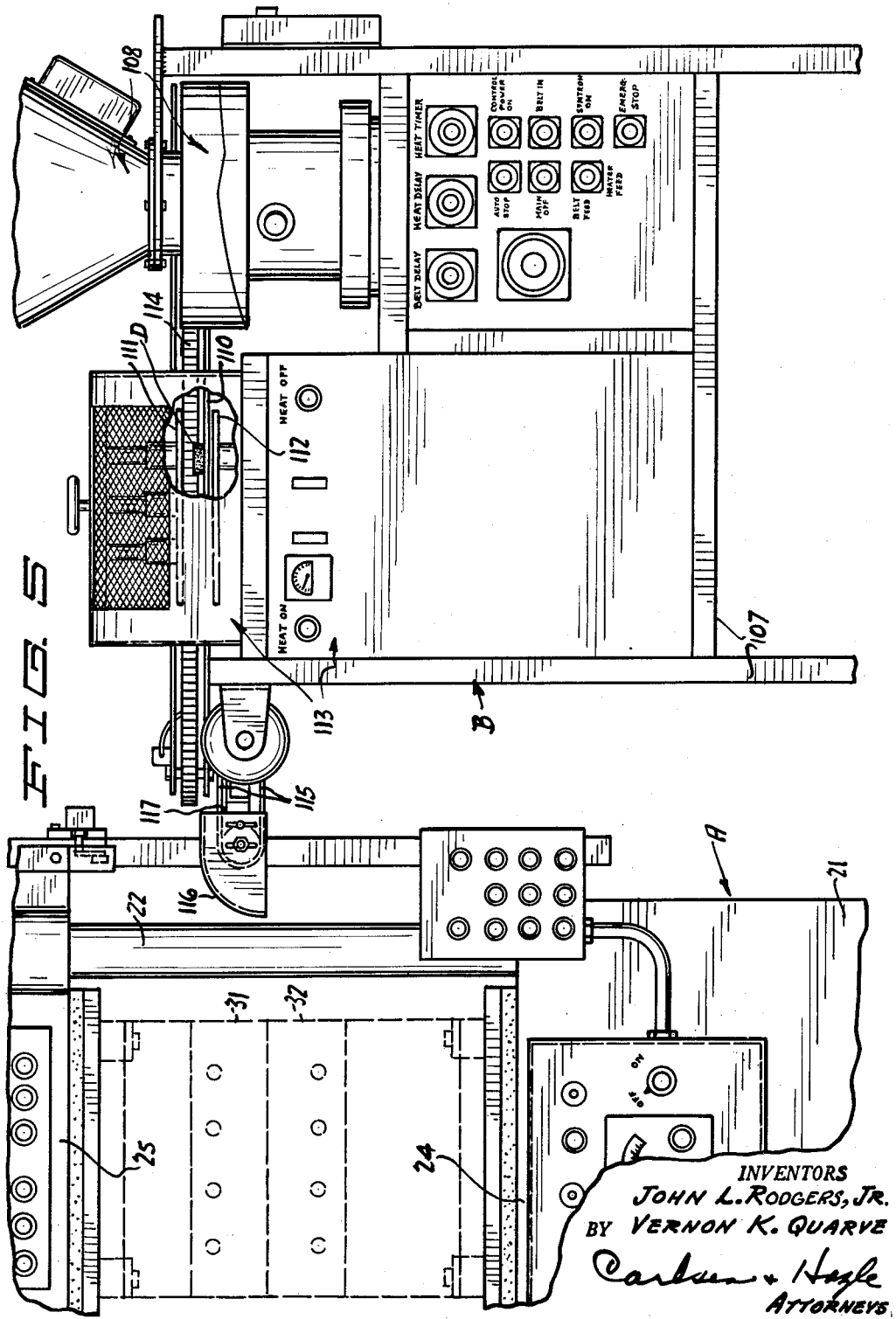
FIG. 5 is a fragmentary frontal elevation on a somewhat enlarged scale of the pre-heating and feed mechanism and an adjacent portion of the press, the molds being again shown in dotted lines but in their closed condition.

The preheater-loader mechanism B supplies accurately predetermined numbers of preheated preforms D to the press A and this mechanism, which is best seen in FIGS. 1, 5 and 15, comprises a suitable frame 107 mounted alongside the press and supporting a hopper and selector unit 108 of a commercially available form known as the "Syntron" into which the preforms are dumped and, after proper orientation, are delivered at 109 into a trough or chute 110 (FIG. 1). Said trough leads the selected preforms toward a high frequency field set up by vertically spaced electrode plates 111—112 in an also commercially available "dielectric" heater unit, designated generally at 113, both of said units 108 and 113 being mounted in the frame 107. In properly sequenced timing with respect to the press operation the required number of preforms are brought into and held in the heating field by the action of a suitable charging device 114 (FIGS. 1 and 5) and as the preforms reach the proper heat they are delivered by a conveyor belt 115 to a loading head 116. This belt and head are mounted on a reciprocating carriage 117 movable by a ram 118 (FIG. 1) toward and away from the press A, the movement of the head 116 toward the press bringing it into position (FIG. 15) between the molds 31–32 and directly over the pot 38 to dump the preheated preforms D into said pot, after which the head retracts as the molds close and the loader is recharged with the next batch of heated preforms for the next cycle of the press.

Obviously the variously the various cooperating components of the preheater-loader mechanism B must be supplied with fluid and air under pressure as well as electrical energy all in proper amounts and in proper timing, in consonance with the operation of the press itself. In addition provision must be made for varying the timing, controlling the power and setting up the equipment for manual or full automatic operation. The necessary circuitry, both fluid pressure and electrical, with control valves, switches, relays, etc. is not however shown herein since the design is well within the ordinary skill of the modern engineer, it is not material to an understanding of the invention, and a complete showing would so complicate this disclosure as to conceal rather than make clear the real invention embraced and claimed herein. Much of the control equipment, the fluid and air supplies and controls are located in the unit E with suitable conduit and cable connections therefrom to the press and the loader, and to the unloader C next to be described.

This unit C, as best shown in FIGS. 1, 9 and 10 but appearing in part also in FIGS. 2, 6, 12 and 13, also comprises a frame, designated at 119 located rearwardly of the press A. Journaled crosswise at the upper, rear corner portion of this frame 119 is a shaft 120 carried in bearings 121 (FIG. 10) and at one end this shaft is driven in either direction of rotation by a pulley 122 over which is trained a belt 123 operating over a drive pulley 124 on a reversible drive motor 125 secured to the frame 119. Spur gear pinions 126 spaced apart on and driven by the shaft 120 mesh with racks 127 secured in parallelism to the underside of a reciprocating and tilting carriage 128 of generally rectangular form as viewed from above. The sides 129 of this carriage have rollers 130 running in parallel tracks 131 tiltably supported by rocker bearings 132 upon the shaft 120 outwardly of the respective pinions 126 (FIG. 10). Secured to upper edges of the tracks 131 is a rectilinear pan 133 having upwardly turned lateral margins or flanges 134 and a cross flange 135 at its frontal end.

Rotation of the shaft 120 in one direction by the motor 125 as heretofore described will now be seen to move the pan 133 endwise and forwardly at its frontal end into the press A to a position between the molds 31—32 when they are open, as see FIG. 13, while reverse rotation of the shaft will travel the pan rearwardly and out of the press to its normal position of FIGS. 1 and 9. This reverse rotational movement of the shaft is translated to the required, controlled reciprocatory movement of the carriage 128 and pass through the interaction of the pinions 126 and racks 127 as will be readily understood. In addition to this reciprocation of the pan it is also tilted about the axis of the shaft 120 from its normal, horizontal position of FIGS. 9 and 10 to the downwardly, rearwardly inclined dumping position seen in the dotted lines in FIG. 9, for which purpose we provide a tilting ram 136 arranged in an upright position behind shaft 120, having a cylinder 137 pivoted at its lower end at 138 to a cross bar 139 forming part of the frame 119, and an upwardly-downwardly movable, fluid or compressed air actuated piston rod 140 the upper end of which is pivoted at 141 to the center of a cross bar 141a joining the tracks 131. Normally the piston 140 is projected upwardly, rocking the forward ends of the tracks and of the pan 133 downward to the horizontal until this motion is limited by contact of adjustable stops 141b (FIG. 9) with upper, forward corners of the frame 119. Supply of fluid or air to the upper end of the cylinder 137 will, however, retract the psiton rod 140 pulling downward on the tracks and rocking the rear end of the pan 133 downward as seen in the dotted lines in FIG. 9, about the axis of the shaft 120 and thus interfering in no way with the reciprocating action of the pan. The tilted position of FIG. 9 is the dumping position at which molded parts collected upon the pan 133 will slide of their own weight off the rear end of the pan to suitable collecting bins or any other means (not here shown) by which the parts are segregated from the culls and collected as may be required.

Here again the operation of mechanism C as regards the travel of the pan 133 and the tilting thereof will obviously be timed in proper sequence with the operation of the press itself but the details of this phase of the mechanism are not regarded as material to an understanding of the invention. It may be noted that the pan 133 will function to collect molded parts and culls when they are ejected from the upper mold as is clear in FIGS. 13 and 14 but where these are ejected upwardly from the lower mold 32 by the ejector pins 104 aforesaid a stripper comb 142 is substituted for the pan. This comb 142 differs from the pan only in that the forward end has suitably spaced, forwardly opening narrow slots 142a to clear the pins 104 as the comb moves forward beneath the parts 40 and cull 41 so that the comb will strip the same from the pins as they move downward against into the mold 32 for the next molding operation.

It is necessary that all particles of flash and any other such matter be cleared from the mold faces 33—34 as well as from all recesses 35, 36, 37 and 39 in the mold, from the upper part of the pot 38 and from the end of the transfer ram plunger 42 and as is well known in the art this may be accomplished by the direction of suitably timed blasts of air across and between the molds when they are opened. The air blasts or jets are indicated by the arrows in FIG. 14 and they issue from suitable forwardly disposed, rearwardly opening nozzles 143 (FIGS. 2, 3, 13 and 14) carried by manifold pipes 144 extending horizontally across the forward pair of standards 22 at a proper elevation and supplied with air through hose lines 145 shown only in part but leading also, of course, to the source (not shown) of compressed air by which various other components of the machine are operated.

In operation, assuming that all parts of the machine are in readiness and a complete cycle of preheating-loading, molding, curing and unloading is to be started, it will first of all be understood that in this condition the molds 31—32 are open, are heated to operating temperature, and the transfer ram plunger 42 is down, opening the pot 38, the loader head 116 is retracted and a load of preforms D are in position for heating in the field between the electrodes 111—112, and the unloader pan 133 is retracted. It will further be assumed that the press is set up for top ejection, transfer molding, that is, the upper mold 31 is cavitied for molding the parts and fitted with the ejector mechanism including the pins 100 and the plate 102, with the latter connected to the upper side bars 68. Compressed air is supplied to the upper ejector rams 70 at lower ends of the cylinders thereof to move the piston rods 75 upward until the contact of the upper side bars 68 with the undersides of the upper platen 25 halt such travel, at which point the ejector pins 100 will clear the face of the upper mold and will remain in such position, being so held by air pressure within the upper ejector rams. At this point it is to be noted, and this is important, that this upward "hold" applied to the ejector pins 100 by the rams 70 is yieldable because the air therein is subject to compression if downward force sufficient for this purpose is applied to the upper side bars 68 and the ejector plate 102 and thus the air operated rams replace the springs usually employed to bias the ejector pins to their retracted positions. Compressed air operation for the purpose is infinitely preferable in that the air supply may be accurately throttled or valved to apply exactly the force most suitable and such adjustments once made are not subject to variations such as compression adjustments of springs, which may vary under vibration or because of fatigue in the springs as two examples, and which adjustments are difficult to properly make, as well as time consuming.

Completing the description of the set-up of the machine for this molding operation, and at this stage thereof, it will be noted (FIG. 13 for example) that when the ejector pins 100 are retracted into the face of the upper mold 31 the sleeves 87 are thrust upward through the openings 88 in the upper platen 25 and the upper stops 94 are adjusted on the rods 66 (also see FIG. 13) to positions adjacent but some distance above the flanged upper ends 89 of these sleeves, at which positions the stops are secured by the set screws 95, or some equivalent fastening means.

A full molding cycle begins with the projection of the loading head 116 into the press (FIG. 15) and delivery by mechanism 115 of the preheated charge of preforms D into the lower mold pot 38. As the preforms are thus delivered to the press they have been preheated to what may be described as a doughy and just short of flowing consistency, so that they retain their integrity during loading but are far enough along toward plasticizing temperature to reduce the total cycle time of the press, this showing up particularly in the "hold" time for curing the cast parts. The loading head 116 immediately retracts, the next charge of preforms start their preheat, and the press closes by action of the clamp ram 27, bringing the molds 31—32 together under very great pressure while at the same time the transfer ram plunger 42 moves upward in the pot 38. The preforms D are further heated after loading by the heat applied to the lower mold and as the transfer plunger 42 starts upward these preforms are on the verge of flowing and the plasticizing of the molding material is completed by the great pressure to which the material is subjected by closure of the molds, the upward travel of the plunger 42 and the forceful accelerating travel of the material as it is ejected from the pot 38 through the sprues 37 and by way of the gates into the molding cavities 35. Accurate loading as to quantity of the molding material as compared to the aggregate volume of the cavities in the molds (including sprues, etc.) is a necessity as will be readily understood by those skilled in this exacting art, in order that moldings or parts of uniform density and strength may be produced with a minimum of flash-thickening at the mold parting line, and so that finishing operations such as machining, polishing and the like may be reduced, or even eliminated in most cases. It will be understood further that we have chosen here to illustrate mold cavities of extreme simplicity, with no provisions for inserts in or aperturing of the parts, but that in practice very complicated parts are molded in the same general manner as here shown and explained.

As the transfer operation is completed and the mold cavities filled (FIG. 11) the condition "holds" while the parts cure or set, and since the material used in such operations is of a thermosetting nature such cure and the hardening of the parts occurs, while the molds are heated as aforesaid. There may be, of course, a relative absence of heat during this curing time as compared to that of the material as it is forced into the cavities at high pressure and tremendous speed, but proper curing depends upon the nature of the material and the temperature at which the parts are held until they are finally ejected from the molds.

On completion of the cure the molds open by return action of the clamp ram 27 and at the same time the transfer ram plunger, being biased in an upward direction by the fluid pressure in the transfer ram 53 which ejected the material from the pot 38, will move upward and the upper end of this plunger 42 will slightly clear the upper surface of the lower mold 32. This first upward over-travel of the plunger 42 will be halted by suitable travel limiting means later to be referred to herein and immediately said plunger 42 starts down by a first return action of the transfer ram 53. The molded or cast parts will remain in the cavities in the upper mold 31 (FIG. 13) until the transfer ram plunger moves downwardly far enough so that the consequent downward movement of the spider 45 and yoke 63, imparted to the actuator rods 66, will cause the upper stops 94 to engage upper ends of the sleeves 87 whereupon continued movement will force the upper side bars 68 and plate 102 downward projecting the ejector pin 100 downward from the face of the upper mold 31 moving the cast parts 40 and attached cull 41 downward (FIG. 12). Normally the parts 40 and cull 41 will remain together and adhere to the ends of the pins 100 as shown but in any event as this stripping or ejection operation is taking place the unloading pan 133 is entering the press as heretofore described. As a result the pan is in position below the upper mold as the parts are ejected and if they fall either singly or as a part of the cull the pan will collect them. Separation of the parts from the ejector pins is no problem since the blasts of air issuing from the nozzles 143 will take care of this, while at the same time clearing the mold faces and cavities of any hardened flash. Dropping of the parts and culls into the pan 133 will ordinarily separate them as well as break loose any flash adhering to the moldings and as the unloading mechanism C returns to its normal position the pan 133 is tilted as aforesaid to dump the parts and culls for ultimate segregation and such further operations as indicated.

The downward movement of the upper side bars 68 to eject the moldings is caused by the transfer ram 53, as the same moves the transfer plunger 42 downward in the plot 38, and is accomplished against the air pressure present in the upper ejector rams 70 which pressure yieldably biases the ejector mechanism upwardly to normal positions (FIGS. 11, 13 and 14). The resulting added compression of the air in the cylinders of the ejector rams 70 may require venting to atmosphere by suitably set relief valves and subsequent restoration as required, all as will be readily understood. A part of such valving appears at 146 in FIG. 7.

As ejection of the parts is completed the transfer ram plunger 42 is again moved upwardly by restoration of fluid pressure for this purpose to the transfer ram 53 and as the stops 94 move upwardly the ejector rams 70 are enabled to reset the ejector mechanism in the upper mold 31 causing the pins 100 to return to their starting positions. The upward movement of the transfer plunger 42 continues to a second, upper over-travel condition at which its upper end again clears the upper surface of the lower mold 32 whereupon the travel of this plunger reverses, and it returns to the loading position of FIG. 15 at which the pot 38 is ready for the next load of preforms and the next cycle of the press.

A comparison of FIGS. 12 and 15 will make clear the over-travel in the downward movement of the transfer plunger 42 (FIG. 12) as the upper ejector mechanism is operated to eject the molded parts from the upper mold, as compared to the relatively higher position (FIG. 15) at which the plunger comes to rest ready for loading of the pot, without actuation of the said ejector mechanism. The upward over-travel of the plunger 42 to expose its upper end portion above the upper surface 34 of lower mold 32 occurs twice (one being shown in FIG. 13) and this plunger thus has what may well be called a double-wipe action which will clear off all flash from the plunger end and its contiguous peripheral surface against the upper edge of the pot 38, in addition to which the plunger end is exposed to the air blasts from the nozzles 143. The tremendous pressures involved in transfer molding operations causes some wear on the transfer plunger and removal of all last vestige of flash is extremely important. Hence the importance of this double-wipe operation of the transfer plunger during each open mold interval of the complete press cycle cannot be overemphasized.

Of course, as the press assumes the position indicated in FIG. 15 just referred to the next cycle of operation is initiated and the cycles repeat themselves as long as required, once the press is set up, brought to operating temperature, and the various operations properly synchronized. As is familiar to all concerned with production molding operations the press may require manual control as it is being set up, as well as manual override of complete automatic control whenever required and safety shut-off if a malfunction occurs. Such control systems are well within the skill of the art, at least in their general terms, and are not disclosed in detail herein.

It will be noted in FIG. 6, however, that we have shown upper and lower limit switches 147—148 operated by a suitable projection 149 on the yoke 63, these switches being vertically adjustably positioned upon an upright support bar 150 located alongside the yoke within the base frame and cabinet structure 20 of the press. Such switches may, as well known, control a solenoid valve (or a series of valves) indicated schematically at 151 to regulate fluid supply to the transfer and ejector system as the transfer plunger and the ejector actuator rods 66 move upwardly and downwardly. Additional limit switches 152 (FIG. 3) at the upper part of the press similarly serve to control the travel of the parts.

If the lower mold 32 includes an ejector mechanism the same may be rendered inoperative while top ejection is being used, as has just been described, the lower stops 96 on the rods 66 being moved downward so that they will not contact and move the sleeves 91 even in the highest position of the transfer plunger 62. Where a pair of molds are made solely for top ejection operation the lower mold usually will have no ejector mechanism but if bottom ejection of the moldings is desired then the lower ejector plate 105 is secured to the lower side bars 69 as seen in FIG. 16. Also in this case then the lower stops 96 are raised so that at the proper time they will engage and move the sleeves 91 and lower side bars 69 upwardly, projecting the pins 104 and lifting the molding from the cavities in the lower mold as shown so that they may be stripped from these pins (as the pins return) by the comb 142. If the upper mold has an ejector mechanism it is rendered inoperative by moving the upper stops 94 well up, out of the way. Air supply to the ejector rams 70—71 will, of course, be properly controlled according to the kind of ejection in use.

As herein shown and described the pot 38 is located in the lower mold 32 which may, therefore, be referred to as the transfer mold and the molding material deposited in the pot is plasticized after the molds are closed, by contrast with compression molding as ordinarily carried out, and wherein the molding material is plasticized before the molds close. In other words, for compression molding the plasticized molding material is in effect poured into the mold cavities following which the molds close to create the pressure necessary for proper density in the moldings and to hold them as they cure. In the case of transfer molding with top ejection in the press here shown the lower transfer mold 32 cooperates with the upper cavity mold 31 but in bottom ejection it will be observed that the transfer mold 32 is also the cavity mold, having the parts forming cavities, the runners, sprues, etc., as clearly seen in FIG. 16.

When compression molding is being practiced the transfer ram serves only to operate the ejector mechanism and may be locked out otherwise so as not to interfere with the operation. Or the plunger 42 may be disconnected at its lower end and removed entirely from the machine, being replaced only when the press is again set up for transfer molding.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a press for molding articles from thermosetting molding materials in suitably cavitied molds and having means for supporting and moving the molds to and between open and closed positions and at least one of the molds having ejector means including ejector members movable with said ejector means to eject molded articles from the mold, transfer mechanism positioned behind one of said molds operative to force molding material into the mold cavities and including a fluid pressure operated reciprocating transfer ram and plunger, actuator rods spaced laterally from said molds and operatively connected to the transfer ram for movement therewith and means supporting said rods for reciprocating movements in planes paralleling that of the plunger, compressed air operated ejector rams operatively connected to said ejector means yieldably biasing the ejector means to normal positions wherein the ejector members clear the mold cavities, and means adjustably fixed on the actuator rods movable with the actuator rods in a direction adapted to engage the ejector means as the transfer ram urges the plunger to move in the same direction and thereby projecting the ejector members into the mold cavities to article ejecting position when the molds are open by overcoming the biasing influence of the compressed air in said ejector rams.

2. A press of the character described for molding articles from a molding material, comprising relatively movable upper and lower cavitied molds, means for raising the upper mold to receive molding material and then moving this mold downward and clamping the molds together to mold the articles therein, upwardly and downwardly movable ejector means including ejector members movable with said ejector means and operatively associated with said upper mold and movable downwardly through the lower face thereof for ejecting molded articles therefrom, a fluid pressure operated reciprocating ram positioned behind one of said molds, vertically extending actuating rods movably mounted adjacent the molds and operatively connected to said ram for downward movement thereby while the molds are opened, means on the actuating rods adjustable to positions for engaging and moving the ejector means downwardly through the face of the upper mold in response to said movement of the rods by said ram when the molds open, air pressure operated means operatively connected to said ejector means operatively connected to said ejector means yieldably biasing said ejector members upwardly in the upper mold, said lower mold having a pot for receiving molding material, and said ram having a reciprocating transfer plunger in said pot for transferring molding material therefrom into the mold cavities after the molds are closed.

3. In a press of the character described, for molding articles from thermosetting resin and similar molding materials, comprising a pair of molds having suitably cavitied faces, said press including means for supporting and moving the molds to and between open and closed positions, at least one of the molds having ejector means including ejector members movable with said ejector means out through the mold face to eject molded articles from the mold and at least one of the molds having a pot in its face, transfer mechanism positioned behind one of said molds operative to force molding material from the pot into the mold cavities and including a fluid pressure operated reciprocating transfer plunger, means for moving the end of said plunger at least twice outward from the pot to exposed position clear of the mold face each time the molds are opened, and means operatively connected between the transfer means and the ejector means operative in consonance with the movement of the plunger to project the ejector members outward from the mold face to article ejecting positions each time the molds are opened.

4. In a press of the character described for molding articles from a molding material in a pair of relatively upper and lower movable molds having suitably cavitied faces, a frame, means supporting the molds thereon, means for opening the molds to receive molding material and then clamping the molds together to mold the articles therein, upwardly and downwardly oppositely movable ejector means including ejector pins movable with said ejector means operatively associated with said molds and movable in and out through said cavitied faces thereof for ejecting molded articles therefrom said ejector means also including, ejector plates slidably associated with the molds and connected to the pins, side bars located alongside the respective molds and attached to said ejector plates, a fluid pressure operated reciprocating ram positioned behind one of said molds, actuating rods movably mounted on the frame laterally of said molds and extending slidably through said side bars adjacent the molds, means connecting the rods to said ram for movement thereby in opposite up and down directions as the molds are opened, and means on the actuating rods selectively adjustable thereon to positions for engaging the ejector means and moving the side bars and ejector plates to project the ejector pins out through the faces of the mold in response to said opposite movements of the rods by said ram while the molds are open.

5. In a press of the character described for molding articles from a molding material in a pair of relatively upper and lower movable molds having suitably cavitied faces, a frame, means supporting the molds thereon, means for opening the molds to receive molding material and then clamping the molds together to mold the articles therein, upwardly and downwardly oppositely movable ejector pins operatively associated with said molds and movable in and out through said cavitied faces thereof for ejecting molded articles therefrom, ejector plates slidably associated with the molds and connected to the pins, side bars located alongside the respective molds and attached to said ejector plates, a fluid pressure operated reciprocating ram mounted behind one of said molds, actuating rods spaced to the side of said molds and movably mounted on the frame and extending slidably through said side bars adjacent the molds, said side bars having sleeves slidable along the rods, means connecting the rods to said ram for movement thereby in opposite up and down directions as the molds are opened, and adjustable collars on the actuating rods selectively adjustable thereon to positions for engaging the said sleeves and moving the said bars and ejector plates to project the ejector pins out through the faces of the mold in response to said opposite movements of the rods by said ram while the molds are open.

6. In a press of the character described for molding articles from a molding material in a pair of relatively upper and lower movable molds having suitably cavitied faces, a frame, means supporting the molds thereon, means for opening the molds to receive molding material and then clamping the molds together to mold the articles therein, upwardly and downwardly oppositely movable ejector pins operatively associated with said molds and movable in and out through said cavitied faces thereof for ejecting molded articles therefrom, ejector plates slidably associated with the molds and connected to the pins, side bars located alongside the respective molds and attached to said ejector plates, a reciprocating member, actuating rods upwardly and downwardly movably mounted on the frame through said side bars adjacent the molds, means connecting the rods to said reciprocating member for movement thereby in opposite up and down directions as the molds are opened, means on the actuating rods selectively adjustable thereon to positions for engaging the side bars and moving the ejector plates to project the ejector pins out through the faces of the mold in response to reciprocating movements of the rods by said reciprocating member while the molds are open, and means operated by compressed air and yieldably resisting such movements of the side bars and the ejector plates and pins.

7. In a press of the character described for molding articles out of plasticized material in a pair of upper and lower relatively movable molds having suitably cavitied faces, a frame, means on the frame for operatively supporting the molds and providing relative movement thereof to and between open and closed positions, ejector pins operatively associated with said molds and being movable outwardly past the cavitied faces and retractable to within the mold, ejector plates vertically slidably associated with the molds and being operatively connected to the pins, a pair of side bars on each ejector plate and disposed on opposite sides of the plate, a transfer plunger slidably disposed in one of the molds, a reciprocating ram on the frame and operatively associated with the plunger for moving same, actuating rods vertically slidably mounted on the frame and extending adjacent the side bars, yoke means on the reciprocating ram and being rigidly connected to said rods, means on each of the rods for engaging the side bars to move same vertically but extending the pins through a cavitied mold face and being selectively adjustable, compressed air cylinders on the frame operatively associated with the respective side bars for yieldably urging same against the rod means urging, and means controllingly associated with the transfer ram and responsively associated with the molds such that as the molds open and ram moves upwardly once causing the plunger to extend beyond a mold face and once downwardly for causing the rod means to engage the side plates for extending the pins beyond a mold face then upwardly again and finally to a final position wherein the plunger is retracted to within a mold and the pins are retracted to within their respective mold.

References Cited in the file of this patent

UNITED STATES PATENTS

| | | |
|---|---|---|
| 1,158,830 | Northrup | Nov. 2, 1915 |
| 1,401,371 | Strand | Dec. 27, 1921 |
| 2,286,728 | Gruss | June 16, 1942 |
| 2,403,948 | Purinton | July 16, 1946 |
| 2,582,891 | Strauss | Jan. 15, 1952 |
| 2,732,898 | Taylor | Jan. 31, 1956 |
| 2,781,546 | Hallenbeck et al. | Feb. 19, 1957 |

FOREIGN PATENTS

| | | |
|---|---|---|
| 494,576 | Canada | July 21, 1953 |

UNITED STATES PATENT OFFICE
CERTIFICATION OF CORRECTION

Patent No. 3,040,378

June 26, 1962

John L. Rodgers, Jr., et al.

It is hereby certified that error appears in the above numbered patent requiring correction and that the said Letters Patent should read as corrected below.

Column 4, line 64, for "article" read -- articles --; column 5, line 28, for "verticaly" read -- vertically --; column 7, line 57, strike out "the variously"; column 8, line 48, for "psiton" read -- piston --; line 74, for "aqainst" read -- again --; column 9, line 50, for "variatiqns" read -- variation --; column 10, line 60, for "pin" read -- pins --; column 11, line 7, for "plot" read -- pot --; column 13, line 22, strike out "operatively connected to said ejector means"; column 15, line 1, for "and" read -- the --.

Signed and sealed this 6th day of November 1962.

(SEAL)
Attest:

ERNEST W. SWIDER
Attesting Officer

DAVID L. LADD
Commissioner of Patents